United States Patent Office 3,806,502
Patented Apr. 23, 1974

3,806,502
NITRATES OF CARDIOACTIVE STEROIDS AND STEROID GLYCOSIDES
Rudolf Megges, Berlin-Buch, Renate Franke, Berlin, Barbara Streckenbach, Berlin-Buch, Günter Kammann, Radebeul, and Kurt Repke, Berlin-Buch, Germany, assignors to Veb Arzneimittelwerk Dresden, Radebeul, Germany
No Drawing. Filed Aug. 31, 1970, Ser. No. 68,528
Int. Cl. C07c 173/00
U.S. Cl. 260—210.5
35 Claims

ABSTRACT OF THE DISCLOSURE

Process for preparing nitrates of cardioactive steroids comprising reacting a cardioactive steroid or steroid glycoside of the cardenolide and bufadienolide type with a 1–50 fold and preferably with a 5–30 fold molar excess of a mixture of nitric acid or a salt thereof with a 1–50 molar amount of acetanhydride, at a temperature of −80° C. to +50° C., and preferably at a temperature of −40° C. to +25° C., preferably in the presence of an organic solvent, for a reaction period of up to five hours, and preferably of up to one hour.

---

This invention relates to a series of novel steroid nitrates having cardioactive properties and to methods of preparing and using the same. More particularly, this invention relates to novel nitrates of steroids and steroid glycosides of the cardenolide and bufadienolide type.

The esterification of hydroxy groups with nitric acid to form nitric acid esters is a well-known reaction. Thus, for example, alcohols such as ethanol can be reacted with concentrated nitric acid in the presence of urea to form the corresponding nitrate. Compounds having a plurality of hydroxyl groups in their molecules for instance sugars are suitably converted into the corresponding sugar nitrate by reaction with acetanhydride/nitric acid mixtures (Advances of Carbohydrate Chemistry, 12, 117–137 (1957)). Certain steroid hormones, for instance, 3α,21-dihydroxy 11-oxo-20-hydroxymethyl-5β-pregnane can be converted into their corresponding nitrates by this method (BRD-AS 1,215,704). Acid sensitive compounds cannot be reacted in this manner as the reaction gives rise to many side reactions. Such acid sensitive compound include the cardioactive steroids. Thus, numerous attempts have been made to convert these compounds into their esters in the presence of a base, for instance, pyridine. However, experiments of this type have provided negative results only, that is, in pyridine solution or in the presence of a basic catalyst such as sodium acetate or nitric acid binding agents such as sodium fluoride, the cardioactive steroids are not converted into their corresponding nitrates.

The object of this invention is to provide an economically feasible process of preparing nitrates of cardioactive steroids.

A further object of this invention is to provide a novel class of steroid nitrates characterized by cardioactivity and having favorable therapeutic indices.

The objects of this invention are obtained by reacting a cardioactive steroid with an excess of acetanhydride and with concentrated nitric acid or its salts, preferably in the presence of a solvent under special conditions (see below). Most advantageously the acetanhydride and concentrated nitric acid are used in the form of a mixture thereof.

The molar ratio of acetanhydride:nitric acid can be in the range of 1:1 to 50:1, mixtures, in the ratio of 1.2:1 to 10:1 being most suitable. There are used per mol of OH group to be esterified 1–50 and preferably 5–30 mols of nitric acid or an equivalent amount of its salt as for instance a heavy metal nitrate such as copper nitrate. The reaction in accordance with the invention takes place at a temperature of between −80 and +50° C. and preferably at a temperature of −40° C. to +25° C.

As solvent for the reaction there can be suitably used all of the halogenated hydrocarbons such as chloroform or methylene chloride, acetone, acetonitrile or nitrobenzene. The acetanhydride/nitric acid or acetanhydride/nitric acid salt mixture can itself act as the solvent.

Cardioactive steroids which are not or are only partially soluble can be reacted in the form of their suspensions. The reaction takes place very quickly and is in general completed within an hour.

The reaction in accordance with the invention is most surprising as it was to have been expected in view of the acid sensitivity of the cardioactive steroids that side reactions such as dehydration and glycoside splitting would take place. Such reactions do not take place at all or only to a negligible extent, if there is reacted per mol of OH group not more than 50 mols of nitric acid or an equivalent amount of a salt thereof and if the reaction mixture substantially immediately after the desired reaction is further worked up.

The process of the invention makes it possible to convert the primary and secondary OH groups in the steroid portion or in the sugar chain of cardioactive glycosides into the corresponding nitrate groups. In general all of the acylatable OH groups present can be esterified. Tertiary OH groups are not affected at all.

Partial esterification is also possible in accordance with the invention. This partial esterification is realized through varying the amount of nitric acid used so that not all of the OH groups will be reacted.

Further, there can be obtained from genines having two or more acylatable OH groups nitrates having free OH groups in the 3-position by splitting the sugar chain of the glycosidepernitrates with acids in the conventional manner.

The partial, i.e., selective esterification is carried out by the following procedure: A protection of designated hydroxy groups through reaction of the steroid with a compound which specifically reacts with cis-1,2 and cis-1,3 diol groups, for instance, boron trioxide is carried out, the remaining free hydroxyl groups are then esterified with nitric acid and thereafter the protective groups or group are split off.

As starting materials may be used i.e. the following cardioactive steriods and steroidglycosides:

| | |
|---|---|
| Digitoxigenin | β-Acetylgitoxin |
| Gitoxigenin | Gitaloxin |
| Digoxigenin | 16-acetylgitoxin |
| 16-epi-gitoxigenin | 16-epi-gitoxin |
| Strophanthidin | Lanatosid B |
| Strophanthidol | Purpureaglykosid B |
| Ouabagenin | Gitorin |
| Scillarenin | Strospesid |
| Hellebrigenin | Verodoxin |
| Hellebrigenol | Digoxin |
| Uzarigenin | α-Acetyldigoxin |
| 16-hydroxystrophanthidin | β-Acetyldigoxin |
| Cannogenin | Desacetyllanatosid C |
| Periplogenin | Lanatosid C |
| Digitoxin | Cymarin |
| α-Acetyldigitoxin | Cymarol |
| β-Acetyldigitoxin | K-strophanthin |
| Lanatosid A | Strophantosid |
| Purpureaglykosid A | Helveticoside |
| Evatromonosid | Erysimosid |
| Odorosid A | Helveticosol |
| Gitoxin | Convallatoxin |
| α-Acetylgitoxin | Convallatoxol |

Cheirotoxin
Desglucocheirotoxin
Proscillaridine
Scillaren
Hellebrin
Desglucohellebrin
Ouabain
Uzarigenindigitoxosid
Uzarin
Adonitoxin
Thevetin A
Peruvosid
Periplocin.

In accordance with the invention, the nitric esters contain the structure of the starting cardioglycoside material or cardioactive steriod in an unaltered form. There can be recovered the steroid or steroid glycoside by removal of the nitrate group from the final product by the known methods for instance through reduction with a sufficiently strong reducing agent, for example, with metals and preferably zinc dust, which does not affect the cardioactive steroid or steroid glycoside. The invention, therefore, provides means whereby the starting compounds for instance, glycosides and genines of the digitalis and strophanthus type and also bufadienolides, for example, proscillaridine accompanied by only small amounts (~5%) sugar chain splitting, can be reformed.

The structure of nitrate is established through IR-spectrum analysis and through elemental analysis. In the IR-spectrum there appear new bands characteristic in particular of the —$ONO_2$— at about 1,640 K, 1,280 K and 860 K.

The nitrates prepared in accordance with the invention exhibit a positive inotropic activity, which activity is partially greater than that of the cardioactive sterod or steroid glycoside.

The results of a comparison of the steroid and its corresponding nitrate with respect to inhibitory effect on the transport ATPase of the heart muscle cell are set out in Table 1 which follows.

TABLE 1

ATPase inhibition (K. Repke and H. Portius, Experientia, 19, 1963, p. 452)

| Compound: | Inhibiting activity, 50% ($\mu$mol) |
|---|---|
| Gitoxigenin-3$\beta$,16$\beta$-dinitrate | 0.43 |
| Gitoxigenin | 10.8 |
| Helveticoside-mono-nitrate | 0.7 |
| Helveticoside-dinitrate | 2.6 |
| Helveticoside | 1.4 |

Certain of the nitrates in accordance with the invention evidence in addition to a positive inotropic activity a simultaneous spasmolytic activity. This can be seen from Table 2 which follows.

TABLE 2

Spasmolytic activity in guinea pig ileum

| Compound: | $ED_{50}$ ($\mu$mol) |
|---|---|
| Digitoxigenin-3$\beta$-nitrate | 1.0 |
| Digoxigenin-3$\beta$-12$\beta$-dinitrate | 10.0 |
| Cymarol-dinitrate | 10.0 |
| Cymarol | 0.092 (tonus increase). |

The nitrates of the cardioactive steroids can also be used as intermediate compounds for further synthesis as for instance by esterifying the hydroxyl groups which have been previously protected by protective groups and which have been restored by splitting off of the protective groups prior to further reaction.

The following examples are given in order to further illustrate the invention and are in no way to be construed as a limitation thereof.

EXAMPLE 1

100 mg. digoxin (0.128 mmol) were dissolved in 2 cm.$^3$ $CH_2Cl_2$ and the solution cooled with an ice-sodium chloride mixture of 0.4 cm.$^3$ acetanhydride (4.2 mmols) and 0.14 cm.$^3$ absolute nitric acid (3.3 mmols) corresponding to 25 mols nitric acid per mol of digoxin was then added. After one minute, 25 cm.$^3$ of water were introduced and the resultant mixture extracted with chloroform. The chloroform extract was washed until neutral. After evaporation of the chloroform, there remained 125 mg. crude digoxin pentanitrate which was purified by chromatographing the same on silica gel followed by crystallization out of pyridine-methanol-water. M.P.: 154.5–156.5° C.; yield: 65 mg. digoxin pentanitrate.

In the same manner, but using in place of the methylene chloride, another solvent, for instance, a halogenated hydrocarbon or acetanhydride, acetone, acetonitrile or nitrobenzene the digoxin pentanitrate was prepared. When acetonitrile was used, a temperature of −10° C. and a reaction time of about 20 minutes were required, while with acetanhydride a reaction time of about 1 hour was sufficient.

After washing until neutral, the nitric acid ester may be precipitated out of solution by means of a high boiling solvent or through the addition of a hydrocarbon such as heptane.

EXAMPLE 2

Digitoxin tetranitrate 1.0 g. digitoxin was dissolved in a mixture of 20 ml. chloroform and 4.0 ml. acetanhydride and under stirring and at a temperature of 20° C. 1.4 ml. absolute nitric acid were introduced therein. After three minutes, 15 ml. methanol were added and the solution washed until neutral with a saturated sodium bicarbonate solution. The organic phase was separated and the aqueous phase extracted two more times with two 10 ml. portions of chloroform. The pure chloroform extracts were combined, washed with water and evaporated to dryness. The residue contained 1.1 g. crude digitoxin tetranitrate.

The crude substance was separated by preparative layer chromatography on silica gel $PF_{254+366}$ (0.55 g./plate of 100 x 20 cm.) using methylene chloride-methanol, 193:7.

As main component, there was recovered by crystallizing out of methanol-methylene chloride, 0.47 g. digitoxin tetranitrate having a melting point of 168–170° C.

EXAMPLE 3

Proscillaridine-2′,3′,4′-trinitrate 4.85 g. proscillardine were suspended under stirring in 160 ml. methylene chloride and reacted at −40° C. with a similarly cooled mixture of 20.2 ml. acetanhydride and 7.0 ml. absolute nitric acid. Under further stirring and at a temperature of −40° C., the proscillaridine went into solution within thirty minutes. After an additional 10 minutes, 25 ml. methanol were introduced, the mixture poured into 0.80 l. water and shaken very thoroughly. The organic phase was separated off, the aqueous phase extracted two more times using 40 ml. methylene chloride for each extraction, the organic phases combined and washed until neutral with aqueous sodium bicarbonate. The methylene chloride was evaporated off and the recovered greasy residue crystallized out of a methanol-water mixture. There were thusly obtained 5.4 g. of crude material on 500 g. silica gel G and using a methylene chloride-methanol mixture, there were separated three main fractions. From the second fraction, through recrystalization out of methanol, 1.7 g. pure proscillaridine-2′,3′,4′-trinitrate having a melting point of 193–196° C. was obtained and from the third fraction through recrystallization out of methylene chloride-methanol, 0.51 g. proscillaridine-3′,4′-dinitrate having a melting point of 200° C. (decomposition) was obtained.

EXAMPLE 4

Digoxin pentanitrate

A solution of 100 mg. digoxin (0.128 mmol) in 2 ml. methylene chloride was introduced into an ice cooled mixture of 1540 mg. Cu(NO$_3$)$_2$·3H$_2$O (6.4 mmols) and 4.5 ml. (47 mmols) acetanhydride and allowed to stand for 10 minutes at 0° C.

Following working up as described in Example 1, there were obtained 115 mg. crude digoxin pentanitrate (90% of theory).

EXAMPLE 5

Digoxin-mono-, di-, tri- and tetranitrate 100 mg. digoxin (0.128 mmol) were reacted with 0.16 cm.$^3$ acetanhydride and 0.056 cm.$^3$ (1.3 mmols) absolute nitric acid according to Example 1. The reaction product contained in addition to small amounts of starting material digoxin, mono-, di-, tri- and tetranitrate.

duced into the solution. After 2 days of standing at room temperature, the solution was neutralized with a saturated aqueous potassium bicarbonate solution and the acetone dissolved off in vacuum. Through repeated shaking with chloroform, there was recovered gitoxigenin-16β-mononitrate together with some sugar nitrate. By column chromatography on silica gel or by preparative thin layer chromatography or by Craig distribution there were recovered after crystallization out of methanol-water, 0.41 g. pure gitoxigenin-16β-mononitrate having a melting point of 212–216° C.

Further compound in accordance with the invention, their properties and their method of production can be seen from Table 3 which follows:

TABLE 3

| | Summation formula | Molecular wt. | N-content percent Calculated | N-content percent Found | Melting point ($\phi$ ° C.) | RF system [1] | Prepared analogous to Ex.— |
|---|---|---|---|---|---|---|---|
| Digitoxigenin-3β-mononitrate | C$_{23}$H$_{33}$NO$_6$ | 419.5 | 3.34 | 3.26 | 191–194 (CH$_3$OH) | 0.94 n-propylether THF[4] 2:1 | 4 |
| Gitoxigenin-3β-16β-dinitrate | C$_{23}$H$_{32}$N$_2$O$_9$ | 480.5 | 5.83 | 5.69 | 218–219 (CH$_3$OH–CH$_2$Cl$_2$) | 0.90 n-propylether THF 2:1 | 4 |
| Gitoxigenin-16β-mononitrate | C$_{23}$H$_{33}$NO$_7$ | 435.5 | 3.22 | 3.43 | 212–214 (CH$_3$OH–H$_2$O) | 0.24 THF-heptane 1:1 | 7 |
| Gitoxigenin-3β,16α-dinitrate | C$_{23}$H$_{32}$N$_2$O$_9$ | 480.5 | 5.83 | 5.63 | 206–207 (CH$_3$OH–H$_2$O) | 0.57 THF-heptane 1:3 | 1 |
| Gitoxigenin-16α-mononitrate | C$_{23}$H$_{33}$NO$_7$ | 435.5 | 3.22 | 3.37 | 146–149 (CH$_3$OH–H$_2$O) | 0.34 THF-heptane 1:1 | 7 |
| Digoxigenin-3β,12β-dinitrate | C$_{23}$H$_{32}$N$_2$O$_9$ | 480.5 | 5.83 | 5.65 | 182–183 (CH$_3$OH–H$_2$O) | 0.93 n-propylether THF 2:1 | 4 |
| Digoxigenin-12β-mononitrate | C$_{23}$H$_{33}$NO$_7$ | 435.5 | 3.22 | 3.11 | 208–210 (CH$_3$OH–H$_2$O) | 0.26 THF-heptane 1:1 | 7 |
| Strophanthidine-3β-mononitrate | C$_{23}$H$_{31}$NO$_8$ | 449.5 | 3.11 | 3.03 | 207–209 (CH$_3$OH–CH$_2$Cl$_2$) | 0.15 THF-heptane 1:1 | 1 |
| Ouabagenin-1β,3β,1α,19 tetranitrate | C$_{23}$H$_{30}$N$_4$O$_{16}$ | 618.5 | 9.05 | 9.05 | 195 (CH$_3$OH–CH$_2$Cl$_2$) | 0.33 THF-heptane 1:1 | 1 |
| Digitoxin-3′,9′,15′,16′-tetranitrate | C$_{41}$H$_{60}$N$_4$O$_{21}$ | 945.0 | 5.93 | 5.72 | 168–170 (CH$_3$OH–CH$_2$Cl$_2$) | 0.80 THF-heptane 1:3 | 2 |
| Gitoxin-16β,3′,9′,15′,16′-pentanitrate | C$_{41}$H$_{59}$N$_5$O$_{24}$ | 1,006.0 | 6.96 | 7.04 | 193–195 (CH$_3$OH–H$_2$O) | 0.38 THF-heptane 1:4 | 1 |
| Gitoxin-3′,9′,15′,16′-tetranitrate | C$_{41}$H$_{60}$N$_4$O$_{22}$ | 961.0 | 5.83 | | | 77 ethyl acetate, propylether 3:1.[2] | 6 |
| Gitoxin-16α,3′,9′,15′,16′-pentanitrate | C$_{41}$H$_{59}$N$_5$O$_{24}$ | 1,006.0 | 6.96 | 6.84 | 170–171 (CH$_3$OH–H$_2$O) | 0.59 THF-heptane 1:3 | 1 |
| Digoxin-12β,3′,9′,15′,16′-pentanitrate | C$_{41}$H$_{59}$N$_5$O$_{24}$ | 1,006.0 | 6.96 | 6.67 | 154.5–156.5 (CH$_3$OH–H$_2$O) | 0.87 THF-heptane 1:2 | 1–4 |
| Digoxin-12β,3′,9′-trinitrate | C$_{41}$H$_{61}$N$_3$O$_{20}$ | 916.0 | 4.58 | 4.15 | 146–150 (CH$_3$OH–H$_2$O) | 0.80 THF-heptane 1:1 | 6 |
| Digoxin-mono-, di-, tri-, tetra-nitrate | | | | | | 22, 34, 52, 63 ethylacetate propylether 3:1.[3] | 5 |
| Lanatoside B-heptanitrate | C$_{49}$H$_{69}$N$_7$O$_{34}$ | 1,300.2 | 7.54 | | 134–138 (CH$_3$OH–H$_2$O) | 0.94 n-propylether THF 2:1 | 1–4 |
| Lanatoside C-heptanitrate | C$_{49}$H$_{69}$N$_7$O$_{34}$ | 1,300.2 | 7.54 | 7.13 | 169–171 (CH$_3$OH–H$_2$O) | 0.34 THF-heptane 1:3 | 1 |
| Cymarine-4′-mononitrate | C$_{30}$H$_{43}$NO$_{11}$ | 593.6 | 2.36 | 2.21 | 123–125 (CH$_3$OH–CH$_2$Cl$_2$) | 0.46 THF-heptane 1:1 | 1 |
| Cymarol-4′,19-dinitrate | C$_{30}$H$_{44}$N$_2$O$_{13}$ | 640.7 | 4.37 | 4.10 | 107–109 (CH$_3$OH–H$_2$O) | 0.47 THF-heptane 1:2 | 1 |
| Helvetikoside-3′,4′-dinitrate | C$_{29}$H$_{40}$N$_2$O$_{13}$ | 624.6 | 4.48 | 4.16 | 205–208 (CH$_3$OH) | 0.50 THF-heptane 1:1 | 1–2 |
| Helvetikoside-4′-mononitrate | C$_{29}$H$_{41}$NO$_{11}$ | 579.6 | 2.42 | 2.47 | 224–225 (CH$_3$OH) | 0.10 THF-heptane 1:1 | 1–2 |
| Helvetikosol-3′,4′,19-trinitrate | C$_{29}$H$_{41}$N$_3$O$_{15}$ | 671.6 | 6.26 | 6.33 | 159–160 (CH$_3$OH–H$_2$O) | 0.23 THF-heptane 1:3 | 1–2 |
| Proscillaridine-2′,3′,4′-trinitrate | C$_{30}$H$_{39}$N$_3$O$_{14}$ | 665.7 | 6.31 | 6.21 | 193–196 (CH$_3$OH) | 0.57 THF-heptane 1:5 | 3 |
| Proscillaridine-3′,4′-dinitrate | C$_{30}$H$_{40}$N$_2$O$_{12}$ | 620.7 | 4.51 | 4.26 | ab. 200° decomp. (CH$_3$OH–CH$_2$Cl$_2$). | THF-heptane 1:5, 0.77 | 3 |

[1] PC on Schleicher/Schüll 2,043 b mgl., formamide impregnated.
[2] DC on silica gel G calculated on R$_{Gitoxinpentanitrate}$=100.
[3] DC on silica gel G calculated on R$_{Digoxinpentanitrate}$=100.
[4] Tetrahydrofuran.

The compounds were distinguished by their migration velocities, as compared to digoxin pentanitrate (system: acetic ester/di-n-propyl ether 75:25 on silica gel G Merck DC-plates).

R(digoxin-pentanitrate=100):
Digoxin-mononitrate=22
Digoxin-dinitrate=34
Digoxin-trinitrate=52
Digoxin-tetranitrate=63

EXAMPLE 6

Gitoxin-3′,9′,15′,16′-tetranitrate 100 mg. gitoxin were dissolved in 2.5 cm.$^3$ pyridine and there were added to the resulting solution a solution of 88 mg. boron trioxide in pyridine (1 mol gitoxin/10 mols borontrioxide). The solution was allowed to stand for 1 hour at 20° C. and then evaporated to dryness. The residue was dissolved in 2 cm.$^3$ CH$_2$Cl$_2$, reacted and worked up as described in Example 1. The gitoxin-3′,9′,15′,16′-tetranitrate demonstrated in thin layer chromatography a relative migration velocity of R(gitoxin-pentanitrate=100)=77

System: acetic ester-di-n-propylether 75:25 on silica gel G Merck DC-plates.

EXAMPLE 7

Gitoxigenin-16β-mono-nitrate 2.0 g. crude gitoxin pentanitrate were dissolved in 400 ml. acetone. 20 ml. concentrated nitric acid were intro-

What is claimed is:
1. Digitoxigenin-3-β-mononitrate.
2. Gitoxigenin-3β,16β-dinitrate.
3. Gitoxigenin-16β-mononitrate.
4. Gitoxigenin-3β,16α-dinitrate.
5. Gitoxigenin-16α-mononitrate.
6. Digoxigenin-3β,12β-dinitrate.
7. Digoxigenin-12β-mononitrate.
8. Strophanthidine-3β-mononitrate.
9. Ouabagenin-1β,3β,11α,19-tetranitrate.
10. Digitoxin-3′,9′,15′,16′-tetranitrate.
11. Gitoxin-16β,3′,9′,15′,16′-pentanitrate.
12. Gitoxin-3′,9′,15′,16′-tetranitrate.
13. Gitoxin-16α,3′,9′,15′,16′-pentanitrate.
14. Digoxin-12β,3′,9′,15′,16′-pentanitrate.
15. Digoxin-12β,3′,9′-trinitrate.
16. A compound selected from the group consisting of digoxin-mono-, di-, tri- and tetranitrate.
17. Lanatoside β-heptanitrate.
18. Lanatoside C-heptanitrate.
19. Cyamarine-4′-mononitrate.
20. Cymarol-4′,19-dinitrate.
21. Helveticoside-3′,4′-dinitrate.
22. Helveticoside-4′-mononitrate.
23. Helveticosol-3′,4′,19-trinitrate.
24. Proscillaridine-2′,3′,4′-trinitrate.
25. Proscillaridine-3′,4′-dinitrate.
26. Process for preparing a nitrate of a cardioactive steroid of the cardenolide or bufadienolide type, said nitrate containing a 14β-hydroxyl group, which comprises reacting a cardioactive steroid or steroid glycoside of the cardenolide or bufadienolide type containing a 14β-hydroxyl group and at least one of primary and secondary hydroxyl groups with acetanhydride and concentrated nitric acid or a heavy metal salt of nitric acid, at a temperature of −80 to +50° wherein the molar ratio of acetanhydride to nitric acid used is in the range of 1:1 to 50:1 and said nitric acid or said salt is used in amount of 1–50 mols per mol of said at least one of primary and secondary hydroxyl groups to be esterified, the 14β-hydroxyl group not participating in the reaction.

27. Process according to claim 26 wherein there is used 5 to 30 mols of nitric acid or salt thereof per mol of said at least one of primary and secondary hydroxyl groups to be esterified.

28. Process according to claim 26, in which the heavy metal salt is copper nitrate.

29. Process according to claim 26 wherein the mixture contains 1.2 to 10 mols of acetanhydride per mol of nitric acid or salt thereof.

30. Process according to claim 26, wherein said reaction is effected at a temperature of −40 to +25° C.

31. Process according to claim 26, wherein said reaction is carried out in the presence of an organic solvent.

32. Process according to claim 26, wherein said reaction is carried out for a period of up to one hour.

33. Process according to claim 4 which comprises utilizing said solvent a chlorinated hydrocarbon, acetone, acetonitrile or nitrobenzene.

34. Process according to claim 26, wherein first the acetanhydride is added to a solution or suspension of the steroid or steroid glycoside followed by addition of absolute nitric acid.

35. Process according to claim 26, wherein the absolute nitric acid is produced in the reaction mixture from concentrated nitric acid by addition of an excess of acetanhydride.

References Cited

UNITED STATES PATENTS

| | | | |
|---|---|---|---|
| 3,432,486 | 3/1969 | Minato | 260—210.5 |
| 3,159,622 | 12/1964 | Garland | 260—239.57 |

OTHER REFERENCES

Pigman: "The Carbohydrates," 1957, pp. 168–170, Academic Press Inc., New York, N.Y.

Wolfrom: "Advances in Carbohydrate Chemistry," vol. 12, pp. 121–122, 1957, Academic Press Inc., New York, N.Y.

JOHNNIE R. BROWN, Primary Examiner

U.S. Cl. X.R.

260—239.57; 424—182, 242, 243